United States Patent
Janssens et al.

(10) Patent No.: US 6,866,920 B2
(45) Date of Patent: Mar. 15, 2005

(54) TRANSPARENT, MULTILAYER, BIAXIALLY ORIENTED POLYESTER FILM, AND PROCESS FOR ITS PRODUCTION

(75) Inventors: Bart Janssens, Wiesbaden (DE); Herbert Peiffer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/117,619

(22) Filed: Apr. 5, 2002

(65) Prior Publication Data

US 2003/0064214 A1 Apr. 3, 2003

(30) Foreign Application Priority Data

Apr. 18, 2001 (DE) .......................................... 101 19 023

(51) Int. Cl.[7] .................... B32B 15/08; B32B 27/06; B32B 27/08; B32B 27/36; B32B 31/30
(52) U.S. Cl. .................... 428/212; 428/213; 428/215; 428/216; 428/334; 428/335; 428/336; 428/457; 428/469; 428/480; 428/483; 428/910; 428/458; 428/36.7; 264/288.4; 264/290.2
(58) Field of Search ................. 428/36.7, 212, 428/213, 214, 215, 216, 334, 335, 336, 457, 458, 469, 480, 483, 910; 269/288.4, 290.2

(56) References Cited

U.S. PATENT DOCUMENTS

| | | | | |
|---|---|---|---|---|
| 4,098,952 A | * | 7/1978 | Kelly et al. | 428/483 |
| 5,096,784 A | * | 3/1992 | Culbertson et al. | 428/482 |
| 5,466,535 A | * | 11/1995 | Higgins et al. | 428/483 |
| 5,795,528 A | | 8/1998 | Klein et al. | |
| 5,955,181 A | * | 9/1999 | Peiffer et al. | 428/212 |
| 6,054,212 A | * | 4/2000 | Peiffer et al. | 428/336 |
| 6,149,995 A | * | 11/2000 | Peiffer et al. | 428/35.8 |
| 6,391,410 B1 | * | 5/2002 | Peiffer et al. | 428/35.7 |
| 6,428,882 B1 | * | 8/2002 | Peiffer et al. | 428/220 |
| 6,534,169 B2 | * | 3/2003 | Pfeiffer et al. | 428/336 |
| 6,537,647 B2 | * | 3/2003 | Peiffer et al. | 428/141 |
| 2002/0037418 A1 | * | 3/2002 | Peiffer et al. | 428/458 |
| 2002/0039646 A1 | * | 4/2002 | Peiffer et al. | 428/216 |
| 2002/0090498 A1 | * | 7/2002 | Peiffer et al. | 428/216 |

FOREIGN PATENT DOCUMENTS

| | | | |
|---|---|---|---|
| EP | 0 144 948 A2 | | 6/1985 |
| EP | 0 602 964 A1 | | 6/1994 |
| EP | 0 878 297 A2 | | 11/1998 |
| EP | 0 878 298 | * | 11/1998 |
| EP | 0 945 256 | * | 9/1999 |
| EP | 0 945 262 A2 | | 9/1999 |
| EP | 0 945 263 | * | 9/1999 |
| EP | 0 999 041 | * | 5/2000 |
| JP | 2000-141575 | * | 5/2000 |
| WO | WO 94/13476 A1 | | 6/1994 |

* cited by examiner

*Primary Examiner*—Vivian Chen
(74) *Attorney, Agent, or Firm*—ProPat, L.L.C.

(57) ABSTRACT

The invention relates to a transparent, biaxially oriented polyester film with a base layer B which is composed of at least 80% by weight of a thermoplastic polyester, and with at least one outer layer A. Another polymeric layer made from a copolymer crosslinked using an acrylic and/or methacrylic compound, has been applied to that side of the film opposite to the outer layer A. The film has low oxygen transmission and exhibits very good adhesion between the respective layers. The coated film moveover has low coefficient of friction, excellent windability, and excellent antistatic performance. It is particularly suitable for packaging purposes, specifically for packaging foodstuffs or other consumable items. The invention further relates to a process for the production of the film.

16 Claims, No Drawings

TRANSPARENT, MULTILAYER, BIAXIALLY ORIENTED POLYESTER FILM, AND PROCESS FOR ITS PRODUCTION

BACKGROUND OF THE INVENTION

1. Field of the Invention

The invention relates to a transparent, biaxially oriented polyester film with a base layer B which is composed of at least 80% by weight of a thermoplastic polyester, and with at least one outer layer A. Another polymeric layer made from a copolymer crosslinked using an acrylic and/or methacrylic compound, has been applied to that side of the film opposite to the outer layer A. The film has low oxygen transmission and exhibits very good adhesion between the respective layers. The coated film moreover has low coefficient of friction, excellent windability, and excellent antistatic performance. It is particularly suitable for packaging purposes, specifically for packaging foodstuffs or other consumable items. The invention further relates to a process for the production of the film.

2. Description of the Related Art

EP-A-0 878 297 describes a transparent, biaxially oriented polyester film with a base layer B which is composed of at least 80% by weight of a thermoplastic polyester, and with an outer layer A. The latter is composed of a mixture of polymers which contains at least 40% by weight of ethylene 2,6-naphthalate units and up to 40% by weight of ethylene terephthalate units, and/or up to 60% of units made from cycloaliphatic or aromatic diols and/or dicarboxylic acids. The film has low oxygen transmission, not more than 80 cm$^3$/(m$^2$ bar d). If the outer layer A of the film contains large amounts of ethylene 2,6-naphthalate units, the film tends to delaminate between the outer layer A and the base layer B. In contrast, if the outer layer A contains low concentrations of ethylene 2,6-naphthalate units, the layer thickness has to be raised in order to achieve the desired oxygen transmission.

According to Example 8 of EP-A-0 878 297, the outer layer A of a film uses pure polyethylene 2,6-naphthalate (PEN) (corresponds to 100% by weight of ethylene 2,6-naphthalate units). In this case there is only slight adhesion between the outer layer A and the base layer B. The film is unsuitable for practical use (e.g. as a composite film), because the bond releases even under a small mechanical load.

According to Example 11 of EP-A-0 878 297, the outer layer A of a film contains 60% by weight of ethylene 2,6-naphthalate units. To achieve the desired low oxygen transmission, less than 80 cm$^3$/(m$^2$ bar d), the thickness of the outer layer A has to be raised to 3 μm, this being economically disadvantageous (high capital expenditure and high material costs).

The film has other disadvantages relating mainly to windability and processability during metallizing. For example, prior art films tend to become electrostatically charged during metallizing/ceramic coating, and tend to block after metallizing/ceramic coating. The printability of the film is also not ideal, in particular when polyvinyl butyral (PVB) inks are utilized.

U.S. Pat. No. 5,795,528 describes a coextruded film laminate which has alternating layers made from PEN and polyethylene terephthalate (PET). Like the film of EP-A-0 878 297, the film tends to delaminate between the individual layers made from PEN and PET, since there is only low adhesion. This type of laminate is therefore likewise unsuitable for practical use.

SUMMARY OF THE INVENTION

It is an object of the present invention to provide a transparent, biaxially oriented polyester film which eliminates the disadvantages of the films of the prior art and which in particular has improved adhesion between the individual layers. The production of the film is to be simple and low-cost, and the film is to have good barrier properties and pose no problems of disposal.

The invention therefore provides a transparent, biaxially oriented and coated polyester film with a base layer B which is composed of at least 80% by weight of a thermoplastic polyester, and with at least one outer layer A, and with a polymeric layer arranged on that side of the film opposite to the outer layer A, wherein the outer layer A comprises a copolymer or a mixture of polymers and copolymers which comprises 90 to 98% by weight of ethylene 2,6-naphthalate units and up to 10% by weight of ethylene terephthalate units, and/or units made from cycloaliphatic or aromatic diols and/or dicarboxylic acids;

the thickness of the outer layer A is more than 0.7 μm and the outer layer A makes up a proportion of less than 25% by weight of the entire film;

the $T_g2$ of the polyester film is above the $T_g2$ of the base layer, but below the $T_g2$ of the outer layer;

the polymeric layer arranged on that side of the film opposite to the outer layer A is composed of a copolymer having acrylic and/or methacrylic crosslinking.

The film of the invention has low oxygen transmission, less than 85 cm$^3$/(m$^2$ bar d), and adhesion which is greater than or equal to 0.5 N/25 mm between the individual layers A and B. The coefficient of friction (COF) of that side of the film opposite to the outer layer A is not more than 0.5.

In addition, there is an improvement in the windability and the processability of the film, in particular during metallization or ceramic coating. The film also has good printability on that side opposite to the outer layer A, in particular using PVB inks.

The film of the invention has a structure of at least two layers. It is then composed of an outer layer A and of a base layer B.

DETAILED DESCRIPTION OF THE PREFERRED EMBODIMENTS

Preference is given to a polyester film in which the copolymer or the mixture of homo- and copolymers of the outer layer A contains from 91 to 97% by weight, in particular from 92 to 96% by weight, of ethylene 2,6-naphthalate units and up to 9% by weight, in particular up to 8% by weight, of ethylene terephthalate units and/or units made from cycloaliphatic or aromatic diols and/or dicarboxylic acids.

Preference is also given to a polyester film whose outer layer A has a thickness of more than 0.8 μm, in particular more than 0.9 μm, and in which this layer makes up a proportion of less than 22% by weight, in particular less than 20% by weight, of the entire film.

Suitable starting materials for preparing the homo- and copolymers are aliphatic diols, such as diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6- hexanediol), or branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of other suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable.

Preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the $C_3$–$C_{19}$-alkanedioic acids are particularly suitable, where the alkane moiety may be straight-chain or branched.

According to the invention, there is another polymeric layer applied to that side of the film opposite to the outer layer A. On the finished film, this other layer has a thickness of from 5 to 2000 nm, preferably from 10 to 500 nm, in particular from 15 to 200 nm. The coating is generally applied by the in-line method, i.e. during the film production process, advantageously prior to transverse stretching. Preference is given to application by the reverse gravure-roll coating process, which is capable of applying extremely uniform coating at thicknesses up to 1000 nm. Preference is also given to application by the Meyer rod method, which can achieve even greater thicknesses of coating. The coating gives the film surface the desired functions (better antistatic performance, better slip, i.e. lower coefficient of friction (COF), good adhesion to printing inks, in particular to PVB-based printing inks), and possible other functions, e.g. better cold-sealability.

The substances mentioned are generally in the form of a dilute solution, emulsion, or dispersion, preferably in aqueous form, when they are applied to the appropriate film surface, and the solvent is then evaporated. If the coatings are applied in-line prior to transverse stretching, the heat treatment during transverse stretching and during the subsequent heat-setting is usually sufficient to evaporate the solvent and dry the coating. The dried coatings then have the desired above-mentioned thicknesses.

This additional coating uses acrylic copolymers. The acrylic copolymers whose use is preferred are substantially composed of at least 50% by weight of one or more polymerized acrylic and/or methacrylic monomers and of from 1 to 15% by weight of a copolymerizable comonomer which in the copolymerized state is capable of intermolecular crosslinking on exposure to an elevated temperature, where appropriate without addition of any separate resin-like crosslinker.

For this purpose preference is given to esters of methacrylic acid, in particular alkyl esters whose alkyl groups contain up to ten carbon atoms, examples here being the methyl, ethyl, n-propyl, isopropyl, n-butyl, isobutyl, tert-butyl, hexyl, 2-ethylhexyl, heptyl or n-octyl group. Particularly good adhesion between the polyester film and matt coatings and reprographic coatings applied thereto is obtained using acrylic copolymers derived from a lower alkyl acrylate ($C_1$–$C_4$), preferably ethyl acrylate, together with a lower alkyl methacrylate, for example. Particular preference is given to the use of copolymers made from an alkyl acrylate, e.g. ethyl acrylate or butyl acrylate, together with an alkyl methacrylate, e.g. methyl methacrylate, in particular in identical molar proportions and where the total amount is from 70 to 95% by weight. The proportion of the acrylate comonomer in acrylic/methacrylic combinations of this type is preferably from 15 to 65 mol %, and the proportion of the methacrylate comonomer is preferably greater than the proportion of the acrylate comonomer by from 5 to 20 mol %. The proportion present of the methacrylate in the combination is preferably from 35 to 85 mol %.

To achieve solvent resistance, use may be made, where appropriate, of comonomers suitable for crosslinking, such as N-methylolacrylamide, N-methylol-methacrylamide, and the corresponding ethers; epoxies, such as glycidyl acrylate, glycidyl methacrylate, and allyl glycidyl ether; carboxy-containing monomers, such as crotonic acid, itaconic acid, or acrylic acid; anhydrides, e.g. maleic anhydride; hydroxy-containing monomers, e.g. itaconic anhydride; hydroxy-containing monomers such as allyl alcohol and hydroxyethyl or hydroxypropyl acrylate or methacrylate; amides, such as acrylamide, methacrylamide, or maleamide, and isocyanates, such as vinyl isocyanate or allyl isocyanate.

Of the above-mentioned crosslinking comonomers, preference is given to N-methylolacrylamide and N-methylolmethacrylamide, primarily because copolymer chains which contain one of these monomers are capable of condensing with one another on exposure to elevated temperatures and therefore of the desired intermolecular crosslinking. The solvent resistance required, where appropriate, from the preferred acrylate coating may, however, also be achieved via the presence of a foreign crosslinker, e.g. of a melamine- or urea-formaldehyde condensation product at less than 20% by weight. If no solvent resistance is needed, there is no need to use crosslinkers.

The method for the coating procedure described above is given in detail in EPA-0 144 948, which is hereby incorporated herein by way of reference.

According to the invention, the coating which is crosslinked by an acrylic compound is applied to that side of the film opposite to the outer layer A, and substantially has the function of improving the antistatic performance of the film and of improving the winding of the film. It substantially has the function of lowering the COF. The mixing specification for the coating may comprise known additives, such as antistats, wetting agents, surfactants, pH regulators, antioxidants, dyes, pigments, antiblocking agents, such as colloidal $SiO_2$, etc. It is usually advisable to incorporate a surfactant in order to increase the capability of the aqueous coating to wet the polyester backing film.

Another advantage is that the production costs for the film of the invention are only slightly higher than those for a film made from standard polyester raw materials. The other properties of the film relevant to its processing and use are substantially unchanged or indeed improved.

In addition, it has been ensured that during production of the film it is possible to reuse the regrind in a proportion of up to 50% by weight, preferably from 10 to 50% by weight, in each case based on the total weight of the film, without any significant resultant adverse effect on the physical properties of the film. The regrind therefore poses no problems of disposal.

The base layer B of the film is composed of at least 80% by weight, preferably at least 90% by weight, of at least one thermoplastic polyester. Polyesters suitable for this are those made from ethylene glycol and terephthalic acid (=PET), from ethylene glycol and naphthalene-2,6-dicarboxylic acid (=PEN), from 1,4-bishydroxy-methylcyclo-hexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to PET and PEN which are composed of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula HO—$(CH_2)_n$—OH, where n is an integer from 3 to 6, branched aliphatic glycols having up to 6 carbon atoms, aromatic diols of the formula HO—$C_6H_4$—X—$C_6H_4$—OH where X is —$CH_2$—, —$C(CH_3)_2$—, —$C(CF_3)_2$—, —O—, —S— or —$SO_2$—, or bisphenols of the formula HO—$C_6H_4$—$C_6H_4$—OH are employed.

The dicarboxylic acid comonomer units are preferably derived from benzenedicarboxylic acids, naphthalenedicarboxylic acids, biphenyl-x,x'-dicarboxylic acids (in particular biphenyl-4,4'-dicarboxylic acid), cyclohexanedicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or $C_1$–$C_{16}$-alkanedicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

The copolymers for the outer layer A may be prepared in three different ways:

1) In copolycondensation, terephthalic acid and naphthalene-2,6-dicarboxylic acid are placed in a reactor together with ethylene glycol, and polycondensed to give a polyester, using the customary catalysts and stabilizers. The terephthalate and naphthalate units are then randomly distributed in the polyester.

2) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

3) Polyethylene terephthalate (PET) and polyethylene 2,6-naphthalate (PEN) are mixed as granules in the desired ratio, and the mixture is fed to the extruder for the outer layer A. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20.0% by weight of the polymers of the base layer B are identical with those of the outer layer A. These are either directly admixed with the base layer B during extrusion or are in any case present in the film due to addition of regrind. The proportion of these copolymers in the base layer is selected in such a way that the base layer has crystalline character.

In another advantageous embodiment, the film encompasses, on the side facing away from the outer layer A, another outer layer C of PET, and this layer comprises pigments. In that case, the layer mentioned at the outset which crosslinks via acrylic compounds has been applied to the outer layer C.

The film of the invention has a high oxygen barrier and the desired good adhesion between its individual layers.

If the polymers/copolymers used for the outer layer A contain less than 90% by weight of ethylene 2,6-naphthalate units and more than 10% by weight of ethylene terephthalate units along with a thickness of the outer layer A of less than 0.7 $\mu$m, although the film then has less permeability to oxygen than a standard polyester film (composed of 100% by weight of PET), its permeability is still too high for the purposes of the present invention.

If the polymers/copolymers used for the outer layer A contain more than 98% by weight of ethylene 2,6-naphthalate units (for example pure PEN), the adhesion between the outer layer A and the base layer B becomes inadequate. When subjected to mechanical stress the film tends toward delamination, which is undesirable and makes the film unusable.

Another feature of the film of the invention is that, unlike in the prior art, the glass transition temperature $T_g$ of the copolymer or of the mixture of homopolymers and copolymers of the outer layer A is higher than the glass transition temperature $T_g$ of the polymers for the base layer B. The glass transition temperature $T_g$ of the copolymers used for the outer layer A is preferably in the range from 90 to 120° C. In the differential scanning calorimetry (DSC) determination of the glass transition temperatures $T_g$, the transitions of the individual layers cannot be differentiated in a composite film.

Glass transitions which are determined on biaxially oriented, heat-set films in the first heating procedure (termed $T_g1$ below) are, due to crystallinity and also to molecular stresses in the amorphous fraction of the specimens, relatively small in size, distributed over a wide temperature range, and shifted to higher temperatures. Because of orientation effects in particular, they are not suitable for characterizing a polymer as such. The resolution of DSC analyzers is often insufficient to detect the glass transitions in the first heating procedure ($T_g1$) of the individual layers of the film of the invention at all, the transitions being "blurred" and small, due to orientation and crystallinity.

If, however, the specimens are melted and then rapidly cooled again to below their glass transition temperature $T_g$ (quenched), the orientation effects are eliminated. On renewed heating, glass transitions (designated $T_g2$ here) are then measured which have a greater intensity and whose temperature is characteristic of the respective polymers. However, even then it is not possible to differentiate the glass transitions of the polyesters of the individual layers, since the layers mix on melting and the polyesters present therein enter into transesterification reactions with one another. It is fully sufficient, however, to compare the temperature $T_g2$ of the entire coextruded films with the temperature $T_g2$ of the polymer used for the base layer B.

In known films the $T_g2$ value of the polyester for the base layer is higher than that of the coextruded film, whereas the $T_g2$ value of the polyester for the outer layer is lower than that of the polyester for the base layer and also lower than that of the coextruded film. Exactly the opposite of this applies for the film of the invention. Here, the $T_g2$ value of the coextruded film is higher than that of the polyester for the base layer B but below the $T_g2$ value of the polyester for the outer layer A.

The base layer B and the outer layer(s) may also comprise customary additives, such as stabilizers and antiblocking agents. They are expediently added to the polymer or to the polymer mixture even before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin, crosslinked polystyrene particles or crosslinked acrylate particles.

The additives selected may also be mixtures of two or more different antiblocking agents or mixtures of antiblocking agents of the same makeup but of different particle size. The particles may be added to the individual layers in the customary concentrations, e.g. as glycolic dispersion during polycondensation or via masterbatches during extrusion. Pigment concentrations of from 0.0001 to 5% by weight have proven advantageous. A detailed description of the antiblocking agents is found, for example, in EP-A-0 602 964, which is incorporated herein by way of reference.

Particularly good oxygen barrier values are achieved if the outer layer A is metallized or ceramic-coated.

The film of the invention may preferably also comprise a second outer layer C. The structure, thickness, and chemical makeup of the second outer layer C may be selected without reference to the outer layer A already present, and the second outer layer C may also comprise the above-mentioned polymers or polymer mixtures, but these do not necessarily have to be identical with the polymers for the first outer layer A. The second outer layer C may also comprise other commonly used outer layer polymers.

Between the base layer B and the outer layer A, there may also be an intermediate layer Z. The thickness of the intermediate layer z is generally above 0.1 μm and is preferably in the range from 0.2 to 20.0 μm, particularly from 0.3 to 10.0 μm.

The thickness of the outer layer C is generally above 0.1 μm, preferably in the range from 0.2 to 5.0 μm, and particularly from 0.2 to 4.0 μm, and the thicknesses of the outer layers may be identical or different.

The total thickness of the film may vary within wide limits and depends on the application envisaged. It is from 6.0 to 100.0 μm, preferably from 8.0 to 50.0 μm, particularly preferably from 10.0 to 30.0 μm, the proportion of the total thickness made up by the base layer B preferably being from 40 to 95%.

The present invention also provides a process for producing this film. It encompasses 1) producing a film having two or more layers from a base layer B and outer layer(s) A and, where appropriate, C, by coextrusion;

2) coating the film, using the layer which crosslinks by virtue of acrylic compounds (preferably between the first and second stretching steps);

3) biaxially stretching the film, and 4) heat-setting the stretched film.

To produce the outer layer A, it is expedient to feed granules of PET and PEN directly to the extruder in the desired mixing ratio. At about 300° C., the two materials can be melted and can be extruded. Under these conditions, transesterification reactions can occur in the extruder and during these copolymers are formed from the respective homopolymers. The polymers for the base layer B are expediently fed in via another extruder.

Any foreign bodies or contamination which may be present can be filtered off from the polymer melt before extrusion. The melts are then extruded through a coextrusion die to give flat melt films and are layered one upon the other. The composite film is then drawn off and solidified with the aid of a chill roll and other rolls if desired.

The biaxial stretching is generally carried out sequentially, stretching first longitudinally (i.e. in the machine direction) and then transversely (i.e. perpendicularly to the machine direction). This leads to orientation of the molecular chains within the polyester. The longitudinal stretching can be carried out with the aid of two rollers rotating at different rates corresponding to the desired stretching ratio. For the transverse stretching, use is generally made of an appropriate tenter frame.

The temperature at which the orientation procedure is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

During the subsequent heat-setting, the film is held for from 0.1 to 10 seconds at a temperature of from 150 to 250° C. The film is then wound up in a conventional manner.

A great advantage of this process is that it is possible to feed the extruder with granules, which do not block the machine.

The film of the invention has very good barrier properties, in particular with respect to oxygen. It therefore has excellent suitability as a packaging material, preferably for packaging foodstuffs or other consumable items.

Surprisingly, the film coated with the acrylic polymers described above has very good handling, very good winding properties, and very good processing performance. It has been ensured that when the film is processed, e.g. to give laminated films, the individual layers of the laminate remain bonded together and do not delaminate. The film is therefore particularly suitable for processing on high-speed machinery, for example.

In addition, the gloss and the haze of the film is better than that of prior art films. The table below gives the most important properties of the films.

TABLE 1

| | Ranges according to the invention | | | |
|---|---|---|---|---|
| | general | preferred | particularly preferred | Test method |
| Outer layer A | | | | |
| Ethylene 2,6-naphthalate units | 90–98% by weight | 91–97% by weight | 92–96% by weight | |
| Ethylene terephthalate units | ≦10% by weight | ≦9% by weight | ≦8% by weight | |
| Thickness | 0.7 μm/–25% of total thickness | 0.8 μm/–22% of total thickness | 0.9 μm/–20% of total thickness | |
| Film properties | | | | |
| Oxygen transmission | ≦85 cm³/(m²bar · d) | ≦80 cm³/(m²bar · d) | ≦75 cm³/(m²bar · d) | DIN 53 380. Part 3 |
| Adhesion between outer layer A and base | ≧0.5 N/25 mm | ≧0.7 N/25 mm | ≧1.0 N/25 mm | internal |
| Coefficient of friction (COF) of polymeric layer with respect to itself | ≦0.5 | ≦0.45 | ≦0.4 | DIN 53 375 |

The following methods were utilized to characterize the raw materials and the films:

Oxygen Transmission

The oxygen barrier test took place using a Mocon Modern Controls (USA) OX-TRAN 2/20, as in DIN 53 380, Part 3.

SV (Standard Viscosity)

Standard viscosity SV (DCA) is measured by analogy with DIN 53726, in dichloroacetic acid. The intrinsic viscosity (IV) is calculated from the standard viscosity as follows: IV (DCA)=$6.907 \cdot 10^{-4}$ SV (DCA)+0.063096.

Coefficient of Friction

Coefficient of friction was determined to DIN 53 375. The coefficient of sliding friction was measured 14 days after production.

Surface Tension

Surface tension was determined using what is known as the ink method (DIN 53 364).

Haze

Haze of the film was measured to ASTM-D1003-52. The Hölz haze measurement was determined by analogy with ASTM-D1003-52, but, in order to utilize the ideal measurement range, measurements were taken on four pieces of film laid one on top of the other, and a 1° slit diaphragm was used instead of a 4° pinhole.

Gloss

Gloss was determined to DIN 67 530. The reflectance was measured, this being a characteristic optical value for a film surface. Based on the standards ASTM-D523-78 and ISO 2813, the angle of incidence was set at 20° or 60°. A beam of light at the set angle of incidence hits the flat test surface and is reflected and/or scattered thereby. A proportional electrical variable is displayed representing light rays hitting the photoelectric detector. The value measured is dimensionless and must be stated together with the angle of incidence.

Glass Transition Temperatures $T_g$

The glass transition temperatures $T_g1$ and $T_g2$ were determined with the aid of DSC (differential scanning calorimetry) on film specimens. A DuPont DSC 1090 was used. The heating rate was 20 K/min, and the specimen weight was about 12 mg. The glass transition $T_g1$ was determined in the first heating procedure. Many of the specimens show an enthalpy relaxation (a peak) at the beginning of the step-like glass transition. The temperature taken as $T_g1$ was that at which the step-like change in heat capacity—ignoring the enthalpy relaxation peak—achieved half of its height in the first heating procedure. In all cases, there was only a single glass transition stage in the thermogram in the first heating procedure. In order to eliminate their heat history the specimens were held at 300° C. for 5 minutes after the heating procedure, and then quenched with liquid nitrogen. The temperature for the glass transition $T_g2$ was taken as the temperature at which the transition reached half of its height in the thermogram for the second heating procedure.

Adhesion Between the Layers

Prior to adhesive bonding, the specimen of film (300 mm long×180 mm wide) of the present invention is placed on a smooth piece of card (200 mm long×180 mm wide; about 400 g/m², bleached, outer laps coated). The overlapping margins of the film are folded back onto the reverse side and secured with adhesive tape.

For adhesive bonding of the film according to the present invention, use is made of a standard polyester film of 12 μm thickness (e.g. Melinex 800), and a doctor device and doctor bar No. 3 from Erichsen, applying about 1.5 ml of adhesive (Novacote NC 275+CA 12; mixing ratio: 4/1+7 parts of ethyl acetate) to the outer layer A of the film. After aerating to remove the solvent, the standard polyester film is laminated to the outer layer A of the film using a metal roller (width 200 mm, diameter 90 mm, weight 10 kg, to DIN EN 20 535). The lamination parameters are:

| | |
|---|---|
| Amount of adhesive: | 5 +/– 1 g/m² |
| Aeration after application of adhesive: | 4 min +/– 15 s |
| Doctor thickness (Erichsen): | 3 |
| Doctor speed level: | about 133 mm/s |
| Bond curing time: | 2 h at 70° C. in a circulating air drying cabinet |

A 25±1 mm strip cutter is used to take specimens about 100 mm in length. About 50 mm of composite is needed here, and 50 mm of unbonded separate laps for securing/clamping the test specimen. The test specimens are secured to a sheet metal support by means of double-sided adhesive tape, by way of the entire surface of the reverse side of the film (base layer B or outer layer C). The sheet with the composite adhesively bonded thereto is clamped into the lower clamping jaw of the tensile test machine. The clamp separation is 100 mm. The unlaminated end of the standard polyester film is clamped into the upper clamping jaw of the tensile test machine (Zwick) so that the resultant peel angle is 180°. The average peel force in N/25 mm is given, rounded to one decimal place.

| | |
|---|---|
| Specimen width: | 25 mm |
| Pretensioning force: | 0.1 N |
| Test length: | 25 mm |
| Separation rate until pretensioning force applied: | 25 mm/min |
| Start position: | 5 mm |
| Test displacement: | 40 mm |
| Sensitivity: | 0.01 N |
| Separation rate: | 100 mm/min |

The peel force test result is equivalent to the minimum adhesion between the layers, since the adhesion between the adhesive and the standard film is markedly greater. A UV lamp, for example, can be used to demonstrate the release of the outer layer A from the base layer B of the film of the present invention.

EXAMPLES

The products used in the following examples and the comparative examples were as follows:

Polyethylene terephthalate (PET), Grade 4020, (KoSa, Germany), SV 800, polyethylene 2,6-naphthalate (PEN) ®Polyclear P 100, (prepolymer from KoSa, Germany), SV 600, Silica particles ®Sylobloc 44 H (Grace, Germany), average particle size (av. p.s.) 2.5 $\mu$m, ®Aerosil TT (Degussa, Germany), average particle size (av. p.s) 0.4 $\mu$m Table 2 lists the makeup of the outer layer A for the films produced as in examples 1 to 2 and comparative examples CE1–CE3.

The properties of the films produced as in examples 1 and 2 and comparative examples CE1–CE3 are given in Table 3.

Example 1

Base layer B: 100% by weight of PET

Outer layer A: 97% by weight of PEN and 3% by weight of PET

Outer layer C: 80% by weight of PET and 20% by weight of masterbatch made from 99.0% by weight of PET and 1.0% by weight of silica particles (50% av. p.s. 2.5 $\mu$m, 50% av. p.s. 0.4 $\mu$m).

Chips made from the materials for the individual layers were dried at a temperature of 160° C. to residual moisture less than 100 ppm and fed to the extruders for the individual layers, any foreign bodies or contamination present being filtered out from the polymer melts at 300° C. prior to the extrusion process. The melts were then coextruded through a coextrusion die to give flat melt films, the residence time of the polymers in extrusion being 5 minutes, whereupon a copolymer was produced from the polymers for the outer layer A. A chill roll was then used to draw-off and solidify the melts. The resultant three-layer ABC film was then oriented longitudinally, and a coating which crosslinks using acrylic compounds was applied by the reverse gravure process to the outer layer C of the film, this side having previously been corona-treated. The dispersion used for this purpose was composed of a 4.5% strength by weight solution of a latex made from a copolymer of 60% by weight of methyl methacrylate, 35% by weight of ethyl acrylate, and 5% by weight of N-methylolacrylamide, together with a surfactant. The dry weight of the coating (based on the biaxially oriented film) was about 0.035 g/m².

The resultant longitudinally stretched and coated film was stretched transversely to give a transparent three-layer film with ABC structure and a total thickness of 12 $\mu$m. The thickness of the outer layer A was 1.2 $\mu$m and that of the outer layer C was 1.0 $\mu$m.

The individual steps of the process were:

| | | |
|---|---|---|
| Extrusion | Temperatures: | |
| | Outer layer A: | 300° C. |
| | Outer layer B: | 300° C. |
| | Outer layer C: | 300° C. |
| Longitudinal stretching | Temperature: | 85–135° C. |
| | Longitudinal stretching ratio: | 4.5:1 |
| Transverse stretching | Temperature: | 85–135° C. |
| | Transverse stretching ratio: | 4.0:1 |
| Stretching | Temperature: | 230° C. |

Besides the properties listed in Table 3 for the resultant film, it has excellent antistatic performance.

Example 2

Example 1 was repeated, except that the outer layer A was composed of 95% by weight of PEN and 5% by weight of PET. As in Example 1, coextrusion was used to produce a three-layer ABC film with total thickness 12 $\mu$m. The thickness of the outer layer A was 1.3 $\mu$m and that of the outer layer C was 1.0 $\mu$m. The coating was carried out as in Example 1.

Comparative Example 1

An ABC film was produced as in Example 8 of U.S. Pat. No. 6,052,212. The film had the required oxygen barrier, but adhesion between the layers A and B as extremely low (see Table 3).

Comparative Example 2

The film was produced by a method based on U.S. Pat. No. 5,795,528, but was composed of two layers A and B, composed of 100% PEN and 100% PET, respectively. The film had the required oxygen barrier, but adhesion between the layers A and B was extremely low (see Table 3).

Comparative Example 3

A film was prepared in accordance with Example 1, but without the coating on the outer layer C. The film did not have the desired low coefficient of friction, and therefore lacked the desired good windability, and did not have the desired good antistatic performance (see Table 3).

TABLE 2

| Example | E1 | E2 | CE1 | CE2 | CE3 |
|---|---|---|---|---|---|
| Ethylene 2,6-naphthalate units in outer layer A (in % by weight) | 97 | 95 | 100 | 100 | 97 |
| Ethylene terephthalate units in outer layer A (in % by weight) | 3 | 5 | 0 | 0 | 3 |

TABLE 3

| Example No. | Film thickness (μm) | Layer thickness A/B/C (μm) | Film structure | Oxygen transmission (cm³/m² bar d) | Adhesion between layers N/25 mm | Gloss 20° measurement angle) Side A | Gloss 20° measurement angle) Side C (or B, as appropriate) | Haze % | COH of side C with respect to itself | Winding performance |
|---|---|---|---|---|---|---|---|---|---|---|
| E1 | 12 | 1.2/9.8/1.0 | ABC | 78 | 0.6 | 205 | 175 | 1.8 | 0.35 | ++ |
| E2 | 12 | 1.3/9.7/1.0 | ABC | 79 | 1.4 | 199 | 180 | 1.6 | 0.35 | ++ |
| CE1 | 12 | 3.0/7.5/1.5 | ABC | 50 | 0.1 | 203 | 175 | 1.8 | | |
| CE2 | 12 | 6.0/6.0 | AB | 45 | 0.1 | 200 | 195 | 2.0 | | |
| CE3 | 12 | 1.2/9.8/1.0 | ABC | 78 | 0.6 | 205 | 175 | 1.8 | 0.55 | – |

Winding performance:
++: very good winding performance, no creasing and little tendency toward longituidinal corrugation on the roll
–: poor winding performance, creasing and high tendency toward longitudinal corrugation on the roll Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

The priority document, German Patent Application No. 101 19 023.9, filed Apr. 18, 2000 is incorporated herein by reference in its entirety.

As used herein and in the following claims, articles such as "the", "a" and "an" can connote the singular or plural.

All documents referred to herein are specifically incorporated herein by reference in their entireties.

We claim:

1. A transparent, biaxially oriented polyester film with a base layer B which is composed of at least 80% by weight of a thermoplastic polyester, and with an outer layer A directly adhered to base layer B, and with a polymeric layer arranged on that side of the film opposite to the outer layer A, wherein
   the outer layer A comprises a copolymer or a mixture of homo- and copolymers which comprises 91 to 98% by weight of ethylene 2,6-naphthalate units and up to 9% by weight of ethylene terephthalate units, and/or units made from cycloaliphatic or aromatic diols and/or dicarboxylic acid;
   the thickness of the outer layer A is more than 0.7 μm and the outer layer A makes up less than 25% by weight of the entire film;
   the $T_g2$ of the polyester film is above the $T_g2$ of the polyester for the base layer B, but below the $T_g2$ of the polyester for the outer layer A;
   the polymeric layer arranged on that side of the film opposite to the outer layer A is composed of a copolymer having acrylic and/or methacrylic crosslinking,
   said film exhibiting an oxygen transmission of less than 85 cm³/(m² bar d) and an adhesion between the individual layers of greater than 0.5 N/25 mm.

2. The film as claimed in claim 1, wherein the copolymer or the mixture of homo- and copolymers in the outer layer A comprises from 91 to 97% by weight of ethylene 2,6-naphthalate units, and the outer layer A has a thickness of more than 0.8 μm, and makes up less than 22% by weight of the entire film.

3. The film as claimed in claim 1, which has a three-layer structure comprising a base layer B disposed between an outer layer A and an outer layer C, said three-layer structure further comprising said polymeric layer.

4. The film as claimed in claim 1, wherein at least one of the outer layers has been pigmented.

5. The film as claimed in claim 1, at least one side of which has been given an electrical corona-discharge treatment.

6. The film as claimed in claim 1, at least one side of which has been in-line coated.

7. The film as claimed in claim 1, wherein the outer layer A has been metallized or ceramic-coated.

8. A process for producing the film as claimed in claim 1, encompassing the steps of
   producing a multilayer film from base and outer layer(s) by coextrusion,
   coating the film,
   biaxially stretching the film, and
   heat-setting the stretched film,
   which comprises stretching the film longitudinally at a temperature in the range from 80 to 130° C. and stretching transversely in the range from 90 to 150° C., and using a longitudinal stretching ratio in the range from 2.5:1 to 6:1, and using a transverse stretching ratio in the range from 3.0:1 to 5.0:1.

9. The process as claimed in claim 8, wherein the stretched film is heat-set by being held at a temperature of front 150 to 250° C. for a period of from 0.1 to 10.0 seconds.

10. The process as claimed in claim 8, wherein cut material arising during film production is reused as regrind for film production in amounts of up to 60% by weight, based on the total weight of the film.

11. The process as claimed in claim 8, wherein cut material arising during film production is reused as regrind for film production in amounts of from 10 to 50% by weight, based on the total weight of the film.

12. A film according to claim 1, wherein said film further comprises one or more antiblocking agents.

13. A film according to claim 1, wherein said copolymer further comprises N-methylolacrylamide or N-methylolmethacrylamide.

14. A transparent, biaxially oriented polyester film with a base layer B which is composed of at least 80% by weight of a thermoplastic polyester, a first outer layer A, and an optional second layer C disposed on said base layer B, and with a polymeric layer arranged on that side of the film opposite to the outer layer A, wherein
   the outer layer A comprises a cepolymer or a mixture of homo- and copolymers which comprises 91 to 98% by weight of ethylene 2,6-naphthalate units and up to 9% by weight of ethylene terephthalate units, and/or units made from cycloaliphatic or aromatic diols and/or dicarboxylic acids;

the thickness of the outer layer A is more than 0.7 µm and the outer layer A makes up less than 25% by weight of the entire film;

the $T_g2$ of the polyester film is above the $T_g2$ of the polyester for the base layer B, but below the $T_g2$ of the polyester for the outer layer A;

the polymeric layer arranged on that side of the film opposite to the outer layer A is composed of a copolymer having acrylic and/or methacrylic crosslinking, at least one of the base layer B or optional layer C includes at least one antiblocking agent, said film exhibiting an oxygen transmission of less than 85 cm³/(m² bar d) and an adhesion between the individual layers of greater than 0.5 N/25 mm.

15. The film as claimed in claim 14, which has a four-layer structure comprising said outer layer C, said base layer B, and an intermediate layer Z disposed between said base layer B and said outer layer A, said four-layer structure further comprising said polymeric layer.

16. The film as claimed in claim 15, wherein the intermediate layer Z has a thickness greater than 0.1 µm.

* * * * *